United States Patent
Hoobler, III et al.

(10) Patent No.: US 10,078,557 B2
(45) Date of Patent: Sep. 18, 2018

(54) USE OF REPLICATED COPIES TO IMPROVE DATABASE BACKUP PERFORMANCE

(71) Applicant: International Business Machines Corporation, Armonk, NY (US)

(72) Inventors: Delbert B. Hoobler, III, Horseheads, NY (US); Lu Nguyen, Tampa, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/850,470

(22) Filed: Dec. 21, 2017

(65) Prior Publication Data
US 2018/0095837 A1  Apr. 5, 2018

Related U.S. Application Data

(63) Continuation of application No. 14/319,043, filed on Jun. 30, 2014.

(51) Int. Cl.
*G06F 17/30* (2006.01)
*G06F 11/14* (2006.01)

(52) U.S. Cl.
CPC ...... *G06F 11/1451* (2013.01); *G06F 11/1446* (2013.01); *G06F 11/1471* (2013.01); *G06F 17/30088* (2013.01); *G06F 17/30368* (2013.01); *G06F 17/30578* (2013.01); *G06F 2201/84* (2013.01)

(58) Field of Classification Search
CPC ............ G06F 11/1451; G06F 11/1446; G06F 11/1471; G06F 17/30088; G06F 17/30368; G06F 17/30578; G06F 2201/84
USPC ...................................................... 707/615
See application file for complete search history.

(56) References Cited

U.S. PATENT DOCUMENTS

| | | |
|---|---|---|
| 7,111,189 B1 | 9/2006 | Sicola et al. |
| 7,412,460 B2 | 8/2008 | Hrle et al. |
| 7,617,369 B1 | 11/2009 | Bezbaruah et al. |
| 7,802,134 B1 | 9/2010 | Sobel et al. |
| 7,934,066 B2 | 4/2011 | Mu et al. |

(Continued)

OTHER PUBLICATIONS

List of IBM Patents or Patent Applications Treated as Related, Appendix P, Filed Herewith, 2 pages.

(Continued)

*Primary Examiner* — Evan S Aspinwall
(74) *Attorney, Agent, or Firm* — Daniel R. Simek (57) ABSTRACT

A backup computing device detects an interruption while receiving a backup copy of a transaction log of a primary database and directs a secondary computing device to continue generation of the backup copy of the transaction log, based on the copy of the transaction log of the primary database. A primary computing device directs a secondary computing device to generate a backup copy of the data file and the primary computing device generates a backup copy of the transaction log, of a primary database. A primary computing device accesses a snapshot of a plurality of snapshots of a primary database, and generates a first portion of a backup copy of the database. The primary computing device directs a second computing device to generate a non-overlapping portion of the backup copy of the database based on a second snapshot of the plurality of snapshots.

1 Claim, 5 Drawing Sheets

(56) References Cited

U.S. PATENT DOCUMENTS

| | | |
|---|---|---|
| 8,074,035 B1 | 12/2011 | Per et al. |
| 8,190,572 B2 | 5/2012 | Anguelov |
| 8,433,682 B2 | 4/2013 | Ngo |
| 8,954,784 B2 | 2/2015 | Bower et al. |
| 9,026,497 B2 | 5/2015 | Gokhale et al. |
| 9,201,745 B2 | 12/2015 | Winbom |
| 9,317,576 B2 | 4/2016 | Merriman et al. |
| 2007/0180302 A1 | 8/2007 | Allen et al. |
| 2011/0161295 A1 | 6/2011 | Ngo |
| 2011/0246819 A1 | 10/2011 | Callaway et al. |
| 2011/0302140 A1 | 12/2011 | Gokhale et al. |
| 2012/0101997 A1 | 4/2012 | Zwilling et al. |
| 2013/0246358 A1 | 9/2013 | Akulavenkatavara et al. |
| 2013/0262389 A1 | 10/2013 | Rathof et al. |
| 2015/0205853 A1 | 7/2015 | Ngo |
| 2015/0212896 A1* | 7/2015 | Pawar ................. G06F 11/1448 707/648 |
| 2015/0227600 A1 | 8/2015 | Ramu et al. |

OTHER PUBLICATIONS

Hoobler, et al., "Use of Replicated Copies to Improve Database Backup Performance", U.S. Appl. No. 14/319,043, filed Jun. 30, 2014.

U.S. Appl. No. 15/062,243, filed Mar. 7, 2016.

\* cited by examiner

USE OF REPLICATED COPIES TO IMPROVE DATABASE BACKUP PERFORMANCE

BACKGROUND OF THE INVENTION

The present invention relates generally to the field of computing systems, and more particularly to improvement of database backup performance and efficiency.

There is a high level of dependence on access to current, accurate, and reliable data, in all areas of contemporary life, such as of commerce, government, education, recreation, and health. Securing data against device failure, network interruption, security threats, and unanticipated catastrophic events, requires practice of well-disciplined backup procedures and plans. The high level of dependence on data also places stringent demands on avoiding interruption of receiving and processing transactions. In some cases it may be necessary to receive and process data transactions twenty-four hours a day, seven days a week, throughout the year. This creates complications in backing up data by disrupting received transactions or risking changes to original data during backup processing.

SUMMARY

According to an embodiment of the present invention, a method for generating a backup copy of a transaction log of a database is presented. A backup computing device detects an interruption while receiving a backup copy of a transaction log of a primary database from a primary computing device, and the backup computing device directs a secondary computing device to continue generation of the backup copy of the transaction log and identifies a last transaction of the transaction log received prior to detection of the interruption. The secondary computing device has access to a copy of the transaction log of the primary database.

According to another embodiment of the present invention, a method of generating a backup copy of a database is presented. Responding to a direction to produce a backup copy of a primary database, in which the primary database includes a data file and a transaction log, a primary computing device directs a secondary computing device to generate a backup copy of the data file. The primary computing device generates a backup copy of the transaction log, and the primary computing device sends the backup copy of the transaction log to a backup computing device.

According to another embodiment of the present invention a method for backing up a database is presented. The primary computing device directs a second computing device to generate a non-overlapping portion of the backup copy of the primary database, based on a corresponding portion of a second snapshot of the plurality of snapshots, and the primary computing device sends the first portion of the backup copy to the backup computing device.

DETAILED DESCRIPTION

Embodiments in accordance with the present invention recognize that generating backup copies of data, such as data found in databases, sometimes requires interruption of transaction activity by the computing device recording and performing transactional updates to the database. Such interruptions may cause impacts ranging from poor performance of the transaction handling server, to total unavailability of the server during backup generation. Embodiments of the present invention provide backup techniques that make use of redundant data management systems, for example a primary data management system that includes a primary database server, a primary storage device, and a primary database, and a secondary data management system, which includes similar corresponding secondary components. In embodiments of the present invention, backup copies are received by a backup computing device, for example a backup server, which may receive, perform, and send instructions associated with the generation of a backup copy of the database.

Embodiments use both the primary and secondary database servers to reduce the time required to generate backup copies of the database and reduce performance impacts. Embodiments also recognize that using identical sources of data for each computing device used to generate the backup copy, avoids duplication or loss of data in the backup copy.

Some embodiments of the present invention use instructions sent to a secondary computing device to continue the generation of a backup copy of a transaction log, which has been interrupted while being performed by a primary computing device. The secondary computing device continues the generation of the backup copy of the transaction log, based on a copy of the transaction log received from the primary computing device prior to the interruption.

Other embodiments of the present invention use both a primary computing device, associated with a primary database, and a secondary computing device, associated with a secondary database that is substantially a copy of the primary database, to split the workload of generating a backup copy of the database. The primary and secondary databases each include a data file and a transaction log. The backup of the data file is generated by one computing device, and the transaction log backup copy is generated by the other computing device, thus splitting the workload of database backup activities.

In still other embodiments of the present invention a snapshot at a point in time, is used as a reference to generate a backup copy of data stored in a logical structure, for example, a database on a storage device, such as a storage server. In one embodiment, the snapshot is generated by, and under the control of, storage hardware, which for example may be a storage server of a data management environment, connected by a network to a server managing the operations and transactions to be applied to a database. In other embodiments, the snapshot may be created by a primary database server, connected to a primary database, and copies of the snapshot are made by the primary database server. In yet other embodiments, the snapshot may be created by a secondary database server connected to a secondary database, which is a replica of the primary database. The snapshot represents the state of the stored data at the time of the generation of the snapshot. In one embodiment of the present invention, a second snapshot is generated, such that the second snapshot is a snapshot of the first snapshot, resulting in identical snapshots having identical states of data within each snapshot. The backup is generated by utilizing both a primary database server and a redundant secondary database server, with each server generating a portion of the backup copy based on access to the snapshot or snapshot of the snapshot, respectively. The combination of the portions of the backup copy results in a complete backup copy that includes the database data of the identical snapshots targeted for backup.

The backup is performed more efficiently since redundant servers are used to each generate a portion of the backup, with the aggregate of the backup portions including all the data from the snapshot of the primary database to be backed up. Transaction processing is not interrupted since the backup generation makes use of the snapshots of the primary database to generate the backup copy.

Figure 1:
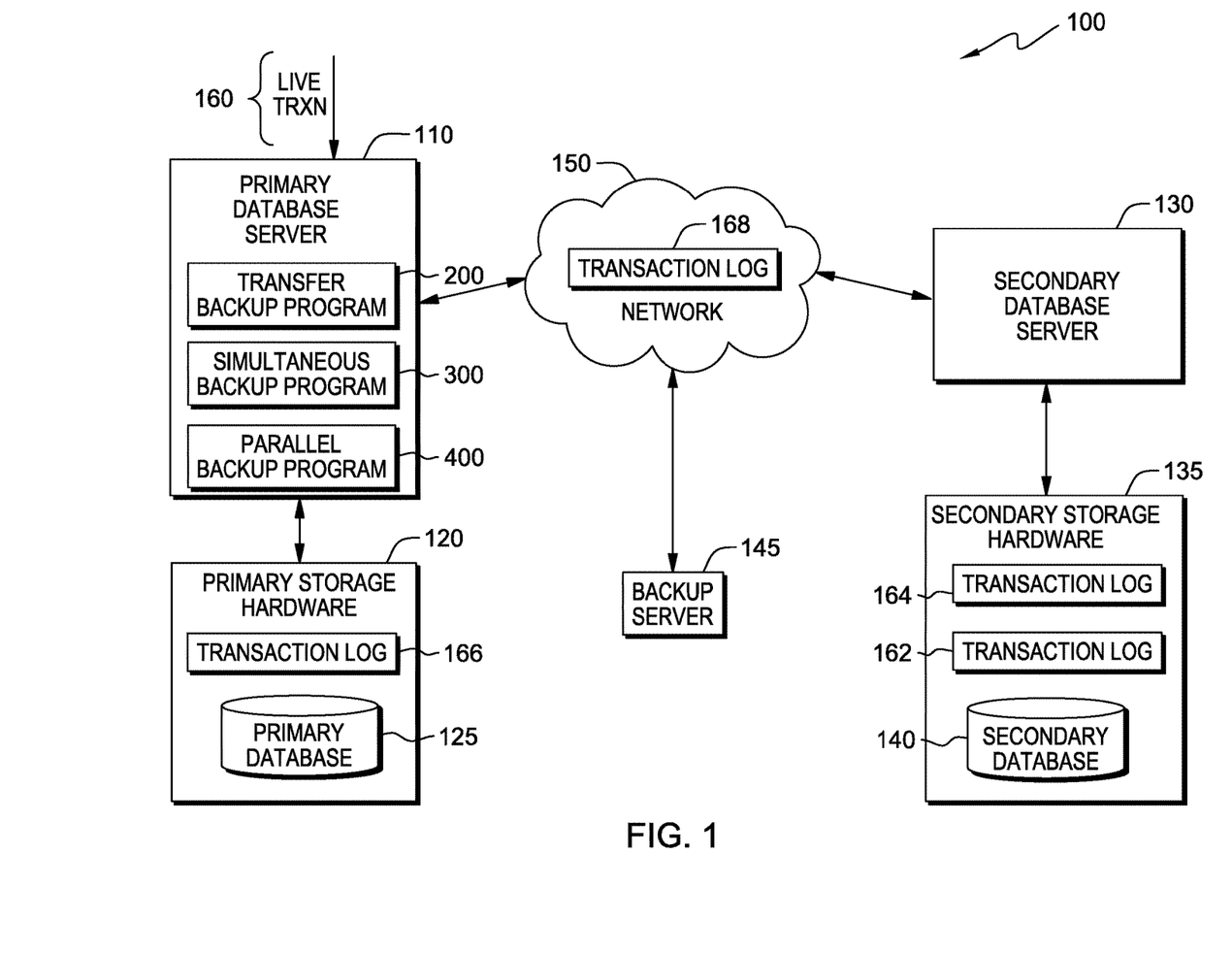
FIG. 1 is a functional block diagram illustrating a distributed computer processing environment, in accordance with one embodiment of the present invention.

The present invention will now be described in detail with reference to the Figures. FIG. 1 is a functional block diagram illustrating a distributed computer processing environment, generally designated 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

FIG. 1 includes primary database server 110, primary storage hardware 120, which includes primary database 125, secondary database server 130, secondary storage hardware 135, which includes secondary database 140, and backup server 145, all interconnected through network 150. Primary database server 110 is depicted as including transfer backup program 200, simultaneous backup program 300, and parallel backup program 400. Secondary database server 130 receives transaction logs, such as transaction logs 162 and 164, and sends the transaction logs to secondary storage hardware 135 to apply the transactions to database 140. The aggregate transaction log (not shown), for secondary database 140 is included in secondary storage hardware 135. In some embodiments of the present invention, secondary database server 130 may include portions of transfer backup program 200, simultaneous backup program 300, and parallel backup program 400, used to complete processing of the backup copy of the database (not shown). Similarly, in some embodiments, backup server 145 may include portions of transfer backup program 200, simultaneous backup program 300, and parallel backup program 400, to perform backup operations based on events detected by backup server 145 (not shown). Network 150 is depicted as including transaction log 168, which is representative of network 150 providing a pathway for the in-process transmission of transaction log 168 from primary transaction server 110 to secondary transaction server 130.

Network 150 can be, for example, a local area network (LAN), a telecommunications network, a wide area network (WAN), such as the Internet, a virtual local area network (VLAN), or any combination that can include wired, wireless, or fiber optic connections. In general, network 150 can be any combination of connections and protocols that will support communications between primary database server 110, secondary database server 130, backup server 145, and the other components of distributed computer processing environment 100, in accordance with embodiments of the present invention.

Backup server 145, is connected to the devices and resources of distributed computer processing environment 100 by network 150 and is often positioned at a different physical location than primary database server 110 and secondary database server 130. Backup server 145 includes components enabling the receipt and storage of backup copies of primary database 125 and backup copies of the aggregate of individual transaction logs, which contain a pre-determined amount of transaction information, hereafter the aggregate of the multiple transaction logs is referred to as the aggregate transaction log. In some embodiments of the present invention, backup server 145 receives a backup of primary database 125 from secondary database server 130, and a backup copy of the most current transaction log from primary database server 110, as a result of dividing backup workload between the two servers. In one embodiment of the present invention, backup server 145 may include portions of transfer backup program 200, simultaneous backup program 300, and parallel backup program 400, and may receive instructions from primary database server 110 to perform the portions of the programs.

Backup server 145 may be a management server, a blade server, a web server, a mobile computing device, or any other electronic device or computing system capable of receiving and sending data, and performing computer-readable program instructions. In other embodiments, backup server 145 may represent a server computing system utilizing multiple computers as a server system, such as in a cloud computing environment. In another embodiment, backup server 145 may be a laptop computer, a tablet computer, a netbook computer, a personal computer (PC), a desktop computer, or any programmable electronic device capable of communicating with primary database server 110 and secondary database server 130, via network 150. In another embodiment, backup server 145 represents a computing system utilizing clustered computers and components (e.g., database server computer, application server computers, etc.) that act as a single pool of seamless resources when accessed within distributed computer processing environment 100. Backup server 145 may include internal and external hardware components, as depicted and described with reference to FIG. 5.

In other embodiments of the present invention, backup server 145 receives a portion of a backup copy that is generated from a snapshot of primary database 125 from primary database server 110, and the remaining portion of the backup copy is generated by secondary database server 130, from a snapshot of the snapshot of primary database 125. Similarly, a backup copy of the transaction log may be generated from a snapshot of the transaction log from primary database server 110. A portion of the backup copy of the transaction log is generated by primary database server 110 from a snapshot of the transaction log, and the remaining portion of the backup copy of the transaction log is generated by secondary database server 130, from a snapshot of the snapshot of the transaction log of primary database server 110.

Secondary storage hardware 135 is connected to secondary database server 130, and includes secondary database 140, and transaction logs 162 and 164. Secondary storage hardware 135 includes storage and computing processor components that support transaction log updates from secondary database server 130 to secondary database 140. Secondary storage hardware 135 receives transaction log updates, such as transaction logs 162 and 164, from secondary database server 130, which are applied to secondary database 140. In one embodiment of the present invention, secondary storage hardware 135 is enabled to generate a snapshot of the data file of secondary database 140 and the aggregate transaction log for secondary database 140, in response to receiving instructions to do so from primary database server 110 or secondary database server 130. In another embodiment, secondary storage hardware 135 may use streaming data to produce a backup. In other embodiments, primary database server 110 and secondary database server 130 may share the same storage hardware, with their respective data stored separately on the same storage hardware. Secondary storage hardware 135 may include internal and external computer components described in more detail with respect to FIG. 5.

Secondary database 140 is a hot-copy replica of primary database 125, and includes redundant data of primary database 125 when transaction logs sent to secondary database server 130 have been applied to update secondary database 140. As a replica of primary database 125, secondary database 140 includes the data of primary database 125 other than transactions from the current segment of the aggregate transaction log that has not been send to secondary database server 130 to apply to secondary database 140. Primary database 125 and secondary database 140 differ only by the transactions that have been applied to primary database 125, but have not yet been sent to secondary database server 130 and applied to secondary database 140. When the generation of a backup copy of the aggregate transaction log of primary database 125 is interrupted or fails, the generation of the backup copy of the aggregate transaction log may continue by instructions that direct secondary database server 130 to continue the generation of the transaction log backup copy based on the copies of transaction logs received by secondary database server 130 from primary database server 110.

Secondary database server 130 receives transaction logs from primary database server 110 and processes the transaction log updates, sending the updates to secondary storage hardware 135, which applies the updates to secondary database 140. In one embodiment of the present invention, transactions received by primary database server 110, are written to a transaction log, and then applied to primary database 125. Transactions continue to be written to the transaction log until a pre-determined file size is attained, for example 1 megabyte (MB). The transaction log containing a full file size of transactions is sent from primary database server 110 to secondary database server 130, and the transactions of the received transaction log, for example transaction log 162, are applied to secondary database 140. In this manner, secondary database 140 includes all transaction applied to primary database 125, except for the current transactions of the transaction log that has yet to reach the pre-determined memory capacity of transactions, and has not been sent to secondary database server 130.

In embodiments of the present invention, secondary database server 130 performs activities supporting the backup techniques described herein. In some embodiments secondary database server 130 executes instructions received from applications running on primary database server 110. In other embodiments, secondary database server may receive instructions from backup server 145 to perform backup tasks when triggering events are detected. Instructions include information enabling the receiving device to perform one or more activities of a transfer backup program 200, simultaneous backup program 300, and parallel backup program 400. In still other embodiments, secondary database server 130 may perform portions of programs 200, 300, and 400, installed on secondary database server 130, in response to receiving initiation messages from other computing devices, for example primary database server 110 or backup server 145.

In one embodiment of the present invention, secondary database server 130 receives instructions from primary database server 110 at the initiation of generating the backup copy. If the generation of the backup copy by primary database server 110 is interrupted or fails, secondary database server 130 continues generating a backup copy of the transaction log based on a copy of the transaction log in the secondary database, and receiving an initiation message from backup server 145, which detects the interruption, to continue generation of the backup copy from the transaction sequence at which the backup copy generation was interrupted.

In another embodiment of the present invention, backup server 145 receives portions of transfer backup program 200 from primary database server at the initiation of the backup copy. Backup server 145 executes transfer backup program 200 based on detection of an interruption of backup data from primary database server 110. In response to the backup failing to continue from primary database server 110 in a pre-defined amount of time, backup server 145 instructs secondary database server 130 to continue generating the backup copy of the transaction logs. Backup server 145 indicates the last transaction received from primary database server 110 and secondary database server 130 begins generation of the backup copy of the transaction log at the next transaction in the sequence.

In another embodiment of the present invention, to more efficiently generate a backup copy of database data, secondary database server 130 receives instruction from simultaneous backup program 300, operating on primary database server 110, to generate a backup copy of the data file of secondary database 140, which is a copy of primary database 125 except for the most recent transactions that have not yet been sent to secondary database server 130 and applied to secondary database 140. Generating a copy of secondary database 140 by secondary database server 130 does not impact the availability or performance of primary database 125 to receive and process transactions. In this embodiment, primary database server 110 generates a copy of the aggregate transaction log, which is typically smaller in size and less demanding of processing time and allows primary database server 110 to maintain high availability while a backup copy is performed. In other embodiments, primary database server 110 generates a copy of the data file of primary database 125, and secondary database server 130 generates a backup copy of the aggregate transaction logs received from primary database server 110. It should be pointed out that although simultaneous backup program 300 is depicted as being operated on primary database server 110, program 300 may be operated by secondary database server 130, or may be operated by other computing devices (not shown in FIG. 1) connected to primary database server 110, secondary database server 130, and backup server 145 via network 150.

Secondary database server 130 may be a management server, a web server, a mobile computing device, or any other electronic device or computing system capable of receiving and sending data, and performing computer-readable program instructions. In other embodiments, secondary database server 130 may represent a server computing system utilizing multiple computers as a server system, such as in a cloud computing environment. In another embodiment, secondary database server 130 may be a laptop computer, a tablet computer, a netbook computer, a personal computer (PC), a desktop computer, or any programmable electronic device capable of communicating with primary database server 110 and backup server 145, via network 150. In another embodiment, secondary database server 130 represents a computing system utilizing clustered computers and components (e.g., database server computer, application server computers, etc.) that act as a single pool of seamless resources when accessed within distributed computer processing environment 100. Secondary database server 130 may include internal and external hardware components, as depicted and described with reference to FIG. 5.

Primary database 125 is the primary source database to which all received transactions are applied. Primary database 125 differs from secondary database 140 only by the transactions that have been applied to primary database 125, but have not yet been sent to secondary database server 130 and applied to secondary database 140. Transactions received by primary database server 110 are applied substantially immediately to primary database 125, whereas secondary database 140 is updated with transactions subsequent to receiving a transaction log that contains a capacity level of transactions, such as transaction log 162, being sent to secondary database server 130 and applied to secondary database 140.

Primary storage hardware 120 is connected to primary database server 110, and includes primary database 125. Primary storage hardware 120 includes storage and computing processor components that support transaction log updates from primary database server 110 to primary database 125. Primary storage hardware 120 receives transaction updates from primary database server 110, for example, the transactions of transaction log 166, which are applied to primary database 125. Primary storage hardware 120 is enabled to generate a snapshot of primary database 125 in response to receiving instructions to do so from primary database server 110, and is enabled to generate a second snapshot from the first snapshot, and make the first snapshot and second snapshot available to primary database server 110 and secondary database server 130, respectively. Primary storage hardware 120 may include internal and external computer components, described in more detail with respect to FIG. 5.

In embodiments of the present invention, a snapshot of primary database 125 is generated by primary storage hardware 120. A snapshot is a read-only, static view of a source database. A database snapshot is consistent with the transactions applied to the source database as of the moment in time at which the snapshot is generated. Use of a snapshot in generating a backup copy of primary database 125 allows continuation of transaction updates without impact to high-availability systems. The time needed to generate a snapshot does not significantly increase with the size of the data set, whereas by contrast, the time required to generate a direct backup of data is proportional to the size of the data set.

Primary database 110 receives live transactions 160 from users external to distributed computer processing environment 100. Primary database 110 receives and sends the transactions to primary storage hardware 120, which applies the updates to primary database 125. Primary database server 110 is depicted as including transaction log 166. In one embodiment of the present invention, live transactions 160, received by primary database server 110, are written to transaction log 166, and then applied to primary database 125 via primary storage hardware 120. Live transactions 160 continue to be written to transaction log 166 until a predetermined memory capacity is attained. The transaction log containing a full capacity of transactions, such as transaction log 164, is sent from primary database server 110 to secondary database server 130, to be applied to secondary database 140.

In one embodiment of the present invention, primary database server 110 sends instructions from transfer backup program 200 to secondary database server 130 running on primary database server 110, to continue generating a backup copy of primary database 125, based on the redundant copy of data in secondary database 140, in the event of an interruption or failure associated with primary database 110. In another embodiment of the present invention, to more efficiently generate a backup copy of database data, primary database server 110 sends instructions from simultaneous backup program 300 to secondary database server 130, to generate a backup copy of secondary database 140, which is a copy of primary database 125, except for the most recent transactions that have not yet been sent to secondary database server 130 and applied to secondary database 140. In this embodiment, primary database server 110 generates a copy of the transaction log, which is less demanding of processing time and allows primary database server 110 to maintain high availability while a backup copy is performed.

Primary database server 110 may be a management server, a web server, a mobile computing device, or any other electronic device or computing system capable of receiving and sending data, and performing computer-readable program instructions. In other embodiments, primary database server 110 may represent a server computing system utilizing multiple computers as a server system, such as in a cloud computing environment. In another embodiment, primary database server 110 may be a laptop computer, a tablet computer, a netbook computer, a personal computer (PC), a desktop computer, or any programmable electronic device capable of communicating with secondary database server 130 and backup server 145, via network 150. In another embodiment, primary database server 110 represents a computing system utilizing clustered computers and components (e.g., database server computer, application server computers, etc.) that act as a single pool of seamless resources when accessed within distributed computer processing environment 100. Primary database server 110 may include internal and external hardware components, as depicted and described with reference to FIG. 5.

In an embodiment of the present invention, primary database server 110 is depicted as hosting transfer backup program 200, simultaneous backup program 300, and parallel backup program 400. In other embodiments, primary database server 110 operates transfer backup program 200, simultaneous backup program 300, and parallel backup program 400, by accessing programs 200, 300, and 400, via network 150. Transfer backup program 200 includes instructions that enable secondary database server 130 to continue generating a backup copy of the aggregate transaction log, using secondary database 140 as a passive copy of primary database 125, because it does not directly service users. Secondary database 140 is also known as a replica of primary database 125. Secondary database 140, includes a copy of all the data of primary database 125 and is maintained in a standby mode. In the event of an interruption or failure by primary database server 110 during generation of a backup copy of the aggregate transaction log, secondary database server 130 continues the generation of the aggregate transaction log backup.

Simultaneous backup program 300 includes instructions for secondary database server 130 to generate a backup copy of secondary database 140, and instructions for primary database server 110 to simultaneously generate a backup copy of the aggregate transaction log. Directing the generation of a backup copy of the database and aggregate transaction log in this manner, maintains a high level of availability of primary database server 110 to continue to receive transactions and update primary database 125, because generating a backup of the aggregate transaction log requires less processing time and resources than generating a backup copy of the data file of the primary database.

In an example embodiment of the present invention, parallel backup program 400 includes instructions for primary storage hardware 120 to generate a snapshot of primary database 125, and generate a copy of the snapshot, producing two identical snapshots of primary database 125. Parallel backup program 400 directs primary database server 110 and secondary database server 130 to use respective copies of the snapshots from which each server generates a portion of a backup copy of primary database 125. The combination of the portions results in a complete backup copy of primary database 125 at its state when the snapshots were generated. Parallel backup program 400 also includes instructions for generating a first snapshot of the aggregate transaction log, and a second snapshot of the aggregate transaction log, based on the first snapshot. The snapshots are made available to primary database server 110 and secondary database server 130, and are used by each server to generate a portion of the transaction logs. The combination of the portions of the transaction logs results in a complete copy of the transaction logs. Parallel backup program 400 directs primary database server 110 and secondary database server 130 to send their respective portions of the backup copy to backup server 145, via network 150. By using snapshots of the data to be backed up, and dividing the workload of generating the backup copies between primary database server 110 and secondary database server 130, the backup will be completed more quickly, and primary database server 110 retains higher performance and remains more available to receive transactions, write the transactions to a transaction log, and have transactions applied to primary database 125. It should be pointed out that the backup processing described above is shared between two computing devices, primary database server 110 and secondary database server 130, to illustrate the performance efficiencies gained by sharing the backup operation. Embodiments of the present invention recognize that the processing of backup files may be shared across a plurality of servers, and is not limited to use of only two servers.

In one embodiment of the present invention, parallel backup program 400 divides the portions of the backup copy evenly between primary database server 110 and secondary database server 130. In this case the entire amount of data to be backed up, for example "N" amount of data records, is divided so that, for example, records 0-N/2 are backed up by primary database server 110, and data records (N/2+1)-N are backed up by secondary database server 130. In another embodiment of the present invention, the portions of the data to be backed up are unevenly shared between primary database server 110 and secondary database server 130. For example, 30% of the data may be backed up by primary database server 110 and 70% of the data may be backed up by secondary database server 130, both servers reading data from their respective snapshot of primary database 125. In yet another embodiment, the backup of data is shared across a plurality of computing devices, with each device generating a portion of the backup file, and the combination of the portions of the backup file performed by each of the plurality of computing devices, results in an aggregate backup file.

Figure 2:
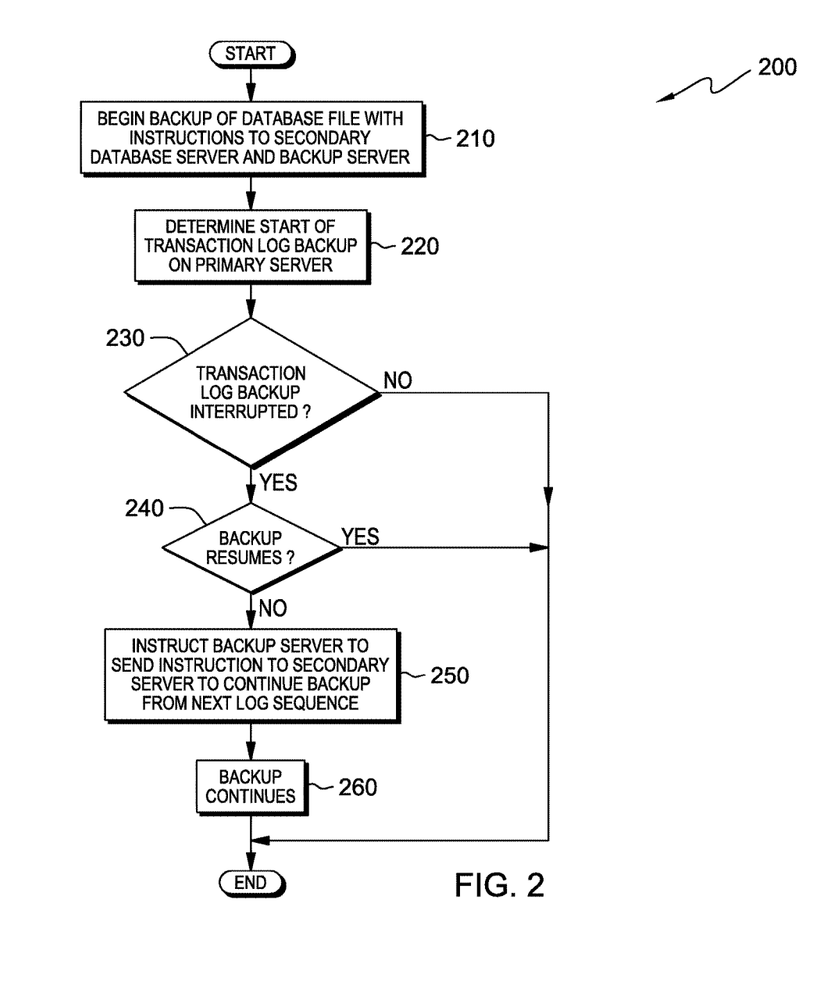
FIG. 2 is a flowchart of a hot-transfer backup program, in accordance with an embodiment of the present invention.

FIG. 2 is a flowchart of transfer backup program 200, in accordance to an embodiment of the present invention. If the backup copy of primary database 125 by primary database server 110 is interrupted due, for example, to a network failure or server error, and the database file backup is not fully complete, the portion of the backup processed up to the point of interruption is lost, and the backup of the database file needs to be repeated. In one embodiment of the present invention, if a failure occurs during the backup of the primary database file, instructions sent from transfer backup program 200 to backup server 145 at the beginning of the backup process, instruct backup server 145 to send an instruction to secondary database server 130 to re-initiate the generation of the backup and to send the backup data to backup server 145. However, if the interruption of the backup copy occurs during the backup of the transaction log, the backup generation is transferred to secondary database 130.

Transfer backup program 200 supports the backup of transaction logs that have not been completely backed up due to an interruption, for example a network failure or a server crash. Receiving an instruction to generate a backup of primary database 125 and the associated transaction logs, transfer backup program 200 begins backup of the database file and sends instructions to secondary database server 130 and/or backup server 145 (step 210). In one embodiment, interruption of the transaction log backup copy is determined by backup server 145 failing to receive backup data after an initiation message received from primary database server 110 and prior to receiving a completion confirmation. The instructions from transfer backup program 200 directs backup server 145 to take actions if a predetermined length of time is exceeded in which primary database server 110 fails to send backup data to backup server 145. For example, backup of primary database 125 is initiated and transfer backup program 200 sends instructions to backup server 145. The instructions sent to backup server 145 direct backup server 145 to take action if a pre-determined amount of time transpires without backup server 145 receiving backup data from primary database server 110.

Transfer backup program 200 monitors the generation of the backup copy of the database file and the transaction log, and determines the start of the transaction log backup on the primary database server (step 220). Transfer backup program 200 determines that the backup of the transaction logs has started, and backup data is being sent to backup server 145.

Having determined the transaction log backup copy has started, an interruption of the transaction log backup is determined based on instructions previously sent by transfer backup program 200, to backup server 145. The instructions determine if there is an interruption of the backup of transaction logs from primary database server 110 (decision step 230). If no interruption is determined by backup server 145 (step 230, "NO" branch), backup continues (step 260). Determining that the receipt of transaction log backup data is interrupted (step 230, "YES" branch), the instructions received from transfer backup program 200 direct backup server 145 to determine if the backup of the transaction logs resumes (decision step 240).

For example, backup server 145 determines the receipt of the backup data from the transaction logs of primary database server 110. Backup server 145 determines if the aggregate transaction log backup copy from primary database server 110 is interrupted. An exemplary, but non-exhaustive list of events that may result in the interruption of the backup and sending of transaction log data to backup server 145 include, a failure associated with network 150, an error associated with primary database server 110, or a crash of primary database server 110.

Having determined that the backup data from primary database server 110 has been interrupted, transfer backup program 200 direct backup server 145 to determine if the backup of the transaction logs resumes within a pre-determined time period, for example a time period that may range from 10 seconds to 4 minutes. The pre-determined time period may be set based on the impact of delay on the backup of the transaction log. Backup server 145 determines if the backup of the transaction logs has resumed, by monitoring transaction rates, or determining a duration of time associated with an interruption, for example. If the interruption ends and the aggregate transaction log backup resumes within a pre-determined length of time, (step 240, "YES" branch), then backup processing of the aggregate transaction log continues (step 260).

If the interruption of transaction log backup data persists, and backup server 145 determines the interruption to exceed a pre-determined length of time, transfer backup program 200 directs backup server 145 to send an instruction to secondary database server 130 to continue backup of the aggregate transaction log beginning with the next transaction log in the sequence (step 250). Backup server 145 monitors the length of time associated with the interruption of data received from primary database server 110 generating a backup of the aggregate transaction log. If the length of the interruption exceeds a pre-determined length of time, for example 30 seconds, then the instructions received from transfer backup program 200 direct backup server 145 to send a signal or message to secondary database server 130 to continue the backup generation of the aggregate transaction log, beginning with the transaction following the last transaction of the sequence of transactions received by backup server 145. For example, the pre-determined length of time for the interruption may be a time within a range of 10 seconds to 4 minutes.

For example, backup server 145, directed by transfer backup program 200, determines that there is an interruption of transaction log backup data from primary database server 110 that exceeds a pre-determined length of time of 30 seconds, and backup server 145 sends a message to secondary database server 130 to continue the backup of the aggregate transaction log. Secondary database server has received all transaction logs from primary database server, with the exception of the most recent transaction log, for example, transaction log 166 (FIG. 1), which has not reached a capacity level of transactions. Instructions received by secondary database server 130, from transfer backup program 200, direct server 130 to continue the generation of the aggregate transaction log backup, beginning with the transaction subsequent to the last transaction of the transaction log sequence received by backup server 145. For example, transaction sequence number E010000000C8.log, is the next transaction in the sequence which follows the last received transaction number sequence, which is sequence E01000000C7.log.

Having directed the secondary database server to continue generating the aggregate transaction log backup, beginning at the transaction sequence following the last sequence received, backup continues (step 260). The backup of the aggregate transaction log continues from the transaction sequence following the last transaction sequence received by backup server 145.

Figure 3:
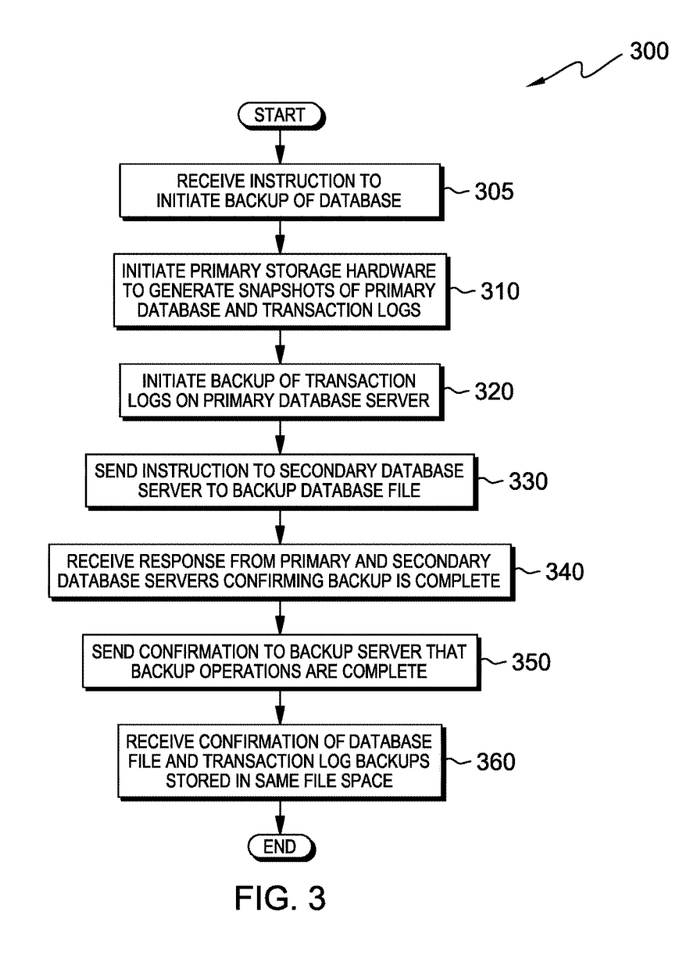
FIG. 3 is a flowchart illustrating operational steps of a simultaneous backup program, operating on a primary data managing server within the distributed computer processing environment of FIG. 1, in accordance with an embodiment of the present invention.

FIG. 3 is a flowchart illustrating operational steps of simultaneous backup program 300, operating on primary database server 110 within distributed computer processing environment 100 of FIG. 1, in accordance with an embodiment of the present invention. In embodiments of the present invention, simultaneous backup program 300 performs the operations of generating a backup copy of the database data file and generating a backup copy of the aggregate transaction log, dividing the backup copying between both the primary database server and secondary database server of FIG. 1. By splitting the workload of generating the backup copies, the time to complete the backup copies is reduced, and by assigning the (typically) smaller transaction log to the primary database server that receives and processes live transactions, the interruption or performance loss of the primary database server is reduced. A benefit of simultaneous backup program 300 is that the backup copies of the transaction log and the data file for primary database 125 can be generated substantially simultaneous, such that the backup copies of the data file and the transaction log may be initiated within a period of three seconds or less of each other. However, the completion of the backup copies may differ by a larger time period, depending on the relative sizes of the data file and the transaction log, therefore the time of completion for the respective backup copies may be significantly greater than three seconds or less. In one embodiment of the present invention, the transaction log is designated to be run on the primary database server, due to the size of a transaction log of a database typically being smaller than the size of a data file of the database.

Simultaneous backup program 300 receives an instruction to perform a backup of the database (step 305). The backup of the database, such as primary database 125 or replica secondary database 140, includes generating a backup copy of the data file and the aggregate transaction log. Receiving the instruction, simultaneous backup program 300 prepares to execute a backup of the database.

In one embodiment of the present invention, before the backup is initiated, simultaneous backup program 300 directs the primary storage hardware (primary storage server) to generate snapshots of the primary database file and the transaction logs of the primary database server (step 310). The snapshots provide a read-only static copy of the primary database file and transaction logs, respectively. The use of snapshots allows the receipt of transactions, writing transactions to the transaction logs, and updates to the primary database file, without interruption or significant delays.

For example, simultaneous backup program 300 sends an instruction to primary storage hardware 120 to generate a snapshot of the database file of primary database 125, and a snapshot of the aggregate transaction log of primary database 125. The snapshots are made available to primary database server 110 and secondary database server 130. In another embodiment of the present invention, simultaneous backup program 300 directs primary database server 110 to create a snapshot of the primary database, and to create a snapshot of the snapshot. The snapshots include identical data states of the primary database and are used as read-only copies of the database data to perform backup copy generation. In yet other embodiments, simultaneous backup program 300 directs secondary storage hardware 135 to create a snapshot of secondary database 140, and to create a snapshot of a snapshot, to be used as identical copies of the secondary database, which is a replica of the primary database. The snapshots created from the secondary database are used to generate a backup copy of the database.

Simultaneous backup program 300 initiates the backup of the aggregate transaction log on the primary database server (step 320). The backup of the aggregate transaction log is generated by the primary database server, using the snapshot of the transaction logs, which is generated by the primary storage hardware. The backup copy of the aggregate transaction log is sent to the backup server, typically positioned at a location different from the primary and secondary database servers and the primary and secondary databases.

For example, simultaneous backup program 300 sends an instruction to primary database server 110 to initiate a backup copy of the aggregate transaction log of primary database 125, using the snapshot of the aggregate transaction log generated by primary storage hardware 120 as a reference. Primary database server 110 continues to receive transactions to be applied to primary database 125, so assigning the backup of the aggregate transaction log, which is generally smaller in size than the database file, maintains a high level of availability and performance for primary database server 110 during the generation of the backup copy of the aggregate transaction log. The backup copy is sent to backup server 145.

Having initiated the backup of the aggregate transaction log, simultaneous backup program 300 sends a message to the secondary database server to initiate the backup of the database file (step 330). In one embodiment of the present invention, the secondary database server receives a message to initiate a backup copy of the primary database data file, which directs the secondary database server to use the snapshot of the data file as a reference to generate the backup copy. In another embodiment, the secondary database server 130 initiates a streaming backup of secondary database 140, which is a replica of primary database 125. The generation of a backup copy of the aggregate transaction log is initiated on the primary database server and instructions are sent to the secondary database server to initiate the generation of a backup copy of the data file of primary database. In one embodiment of the present invention, this may result in the generation of the respective backup copies occurring in a substantially simultaneous time frame, in which the backup copies of the transaction log and the data file of the primary database are initiated in three seconds or less of each other, but each backup copy may be completed at significantly different points in time, depending on the relative size of the backup copies. It should be pointed out that although embodiments of the present invention do not require simultaneous generation of the respective backup copies, simultaneous generation of backup copies provides efficiencies. Because the secondary database server does not receive live transactions, there is no performance or availability impact related to receiving live transactions by having secondary database server perform the backup of the data file, which is typically larger than the aggregate transaction log.

For example, simultaneous backup program 300 sends an instruction to secondary database server 130 to initiate the backup of the database file of primary database 125. Secondary database server 130 is directed to use the snapshot of primary database 125, which was generated by primary storage hardware 120. Secondary database server 130 begins generating the backup copy of the database file from the snapshot of primary database 125, and sends the backup copy data to backup server 145.

It should be noted that embodiments of the present invention directing the generation of the primary database backup to be performed by secondary database server 130, are intended to minimize performance and availability impacts to primary database server 110. By directing the backup of the aggregate transaction log, which are typically smaller in size relative to the corresponding database data file, to the primary database server, there is less resource demand to compete with the processing of live transactions, which the primary database server continues to receive during backup operations. In some embodiments of the present invention, directing the backup of the primary database data file to the primary database server may result in little or no impact to the performance and availability of the primary database server, based on use of the snapshot of the primary database, and the demand of live transactions on primary database server 110.

Simultaneous backup program 300 receives a response from the primary database server and the secondary database server confirming the backup is complete (step 340). Simultaneous backup program 300 receives a confirmation response from each of the primary database server and the secondary database server, indicating that the respective backup copies are complete and have been sent to the backup server. For example, a confirmation response is received from primary database server 110 and secondary database server 130, indicating that the aggregate transaction log backup copy has been completed by primary database server 110, and the backup copy of the data file of primary database 125 has been completed. The confirmation responses are received by simultaneous backup program 300.

Having confirmation from the primary and secondary database servers that the respective backups are complete, simultaneous backup program 300 sends a confirmation to the backup server that the backup operations are complete (step 350). For example, simultaneous backup program 300 receives confirmation from primary database server 110 that the aggregate transaction log backup is complete, and receives confirmation from secondary database server 130 that the backup of the database file of primary database 125 is complete. Simultaneous backup program 300 sends a confirmation to backup server 145 that backup operations are complete.

Simultaneous backup program 300 receives a confirmation that the backup copies of the database file and transaction logs are received and stored in the same designated storage space (step 360). For example, simultaneous backup program 300 sends a message to backup server 145 confirming the completion of the backup of the transaction logs and the database file of primary database 125. Simultaneous backup program 300 receives a confirmation from backup server 145 that the backup copies of the transaction logs and the database file have been received and are stored in the same designated filespace, and simultaneous backup program 300 ends. The backup operations performed by simultaneous backup program 300 are completed more timely and efficiently than if all operations were performed by a single server or if operations were performed sequentially.

Figure 4:
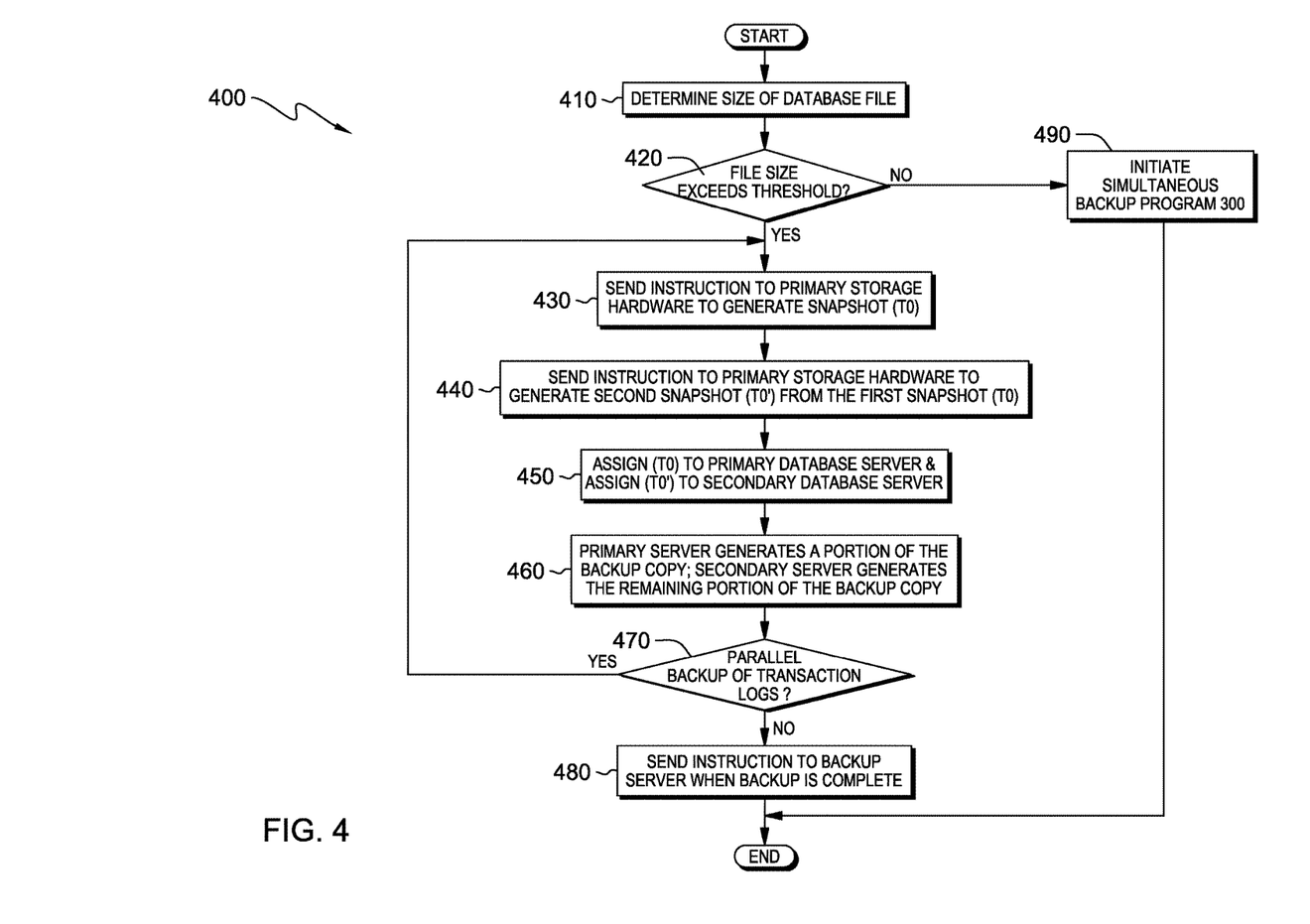
FIG. 4 is a flowchart illustrating operational steps of a parallel backup program, operating on a primary database server within the distributed computer processing environment of FIG. 1, in accordance with an embodiment of the present invention.

FIG. 4 is a flowchart illustrating operational steps of parallel backup program 400, operating on a primary database server within the distributed computer processing environment of FIG. 1, in accordance with an embodiment of the present invention. In some embodiments of the present invention, parallel backup program 400 generates portions of a backup copy on each of a plurality of database servers. The backup copy is based on an initial snapshot of the primary database, making use of a hardware cascading snapshot capability. Each portion of the backup copy is generated by a separate server, using a subsequent snapshot of the initial snapshot of the primary database, such that each snapshot used in generating a portion of the backup copy is an exact duplicate of the initial snapshot. The portions of the backup copy are generated in a substantially parallel manner, and the combination of the generated portions constitutes a complete backup copy. Generating portions of a backup copy across a plurality of servers, provides greater efficiency, and improves performance and availability of the primary database server during backup operations.

In the following description of parallel backup program 400, the parallel backup copy of the database data file and the aggregate transaction log are described using two database servers and a backup server; however, this description serves to represent examples of embodiments of the present invention, and is not intended to limit or exclude the use of a more than two servers to generate and store backup copies of data and transactions.

Parallel backup program 400 determines the size of the database file (step 410). Parallel backup program 400 offers efficiencies in backing up larger database files. Efficiencies realized may be proportional to the size of the database file, and for smaller database file sizes, the efficiencies gained may not warrant use of parallel backup program 400. In one embodiment of the present invention, parallel backup program 400 determines the size of the database file of primary database 125, to use the database file size information in subsequent decision making. In other embodiments of the present invention, the condition of other attributes in addition to file size, such as analytics from previous backups, may be used to determine if shared backup workload may provide significant efficiencies. Other attribute analytics may include information regarding network bandwidth and the number of backup copies required.

Parallel backup program 400 determines if the database file size exceeds a threshold (decision step 420). Parallel backup program 400 compares the database file size to a pre-determined threshold of file size, which has been chosen for decision making of whether the backup of the database file is performed by parallel backup program 400 or, for example, by simultaneous backup program 300. Determining that the file size does not exceed the pre-determined threshold of file size (step 420, "NO" branch), parallel backup program 400 sends a message to initiate simultaneous backup program 300 (step 490), and parallel backup program 400 ends. For example, if the file size of a database file is determined to be 50 megabytes (MB) and the pre-determined threshold of file size is set to 200 MB, then the database file does not exceed the pre-determined file size threshold and parallel backup program 400 initiates simultaneous backup program 300 (FIG. 3), and ends.

Determining that the file size exceeds the pre-determined threshold of file size (step 420, "YES" branch), parallel backup program 400 sends an instruction to the primary storage hardware to generate a snapshot of the data file of the primary database (step 430). The primary storage hardware performs operations on the primary database in response to received instructions. The primary storage hardware is enabled to generate a snapshot of the database file of the primary database. A snapshot of the primary database is a read-only copy that captures the state of the data in the database file at the moment in time in which the snapshot is generated. In embodiments of the present invention, the snapshot generated by the primary storage hardware may be accessed by the primary database server and the secondary database server.

For example, parallel backup program 400 sends an instruction to primary storage hardware 120 (FIG. 1), to generate a snapshot, hereafter referred to as the first snapshot, of the database file of primary database 125. The first snapshot is generated at a specific point in time designated by "T0", and is accessible by primary storage hardware 120, primary database server 110, and secondary database server 130.

Parallel backup program 400 sends an instruction to the primary storage hardware to generate a second snapshot from the first snapshot (step 440). The primary storage hardware accesses the first snapshot and generates a second snapshot based on the first snapshot, which is also known as a cascading snapshot, resulting in identical snapshots. Both snapshots are read-only static views of the database file of the primary database, and are consistent with respect to committed transactions, with the primary database at the moment in time when the snapshot was generated.

In another embodiment, the first snapshot generation may be performed by secondary storage hardware 135, in which a snapshot is generated based on the database file of secondary database 140. Secondary database 140 is a copy of primary database 125 at the point in time when the last transaction log was sent from primary database server 110 to secondary database server 130 and was applied to secondary database 140. Secondary storage hardware 135 generates a second snapshot from the first snapshot, resulting in identical snapshots. Both the first and second snapshots are accessible to both primary database server 110 and secondary database server 130.

Having generated a first snapshot from the primary database and a second snapshot from the first snap shot, parallel backup program 400 assigns one snapshot (T0) to the primary database server and assigns the other snapshot (T0') to the secondary database server (step 450). In one embodiment of the present invention, the first snapshot is assigned to the primary database server and provides a dedicated, static source of the primary database from which a portion of a backup copy is generated by the primary database server. The second snapshot is assigned to the secondary database server, which is identical to the first snapshot and provides a consistent source for the secondary database server to generate a remaining portion of the backup copy. For example, parallel backup program 400 assigns the first snapshot (T0) to primary database server 110, and assigns the second snapshot (T0') to secondary database server 130. Both servers use their respective snapshot as a reference to generate a portion of a backup copy of the database file of primary database 125, and the combination of the portions results in a complete backup copy, including all the data from the identical snapshots. In another embodiment, the first snapshot is assigned to secondary database server 130 and the second snapshot is assigned to primary database server 110.

Parallel backup program 400 instructs the primary database server to generate a portion of the backup copy, and instructs the secondary server to generate the remaining portion of the backup copy (step 460). The primary database server and the secondary database server both generate portions of the backup copy, in parallel, using the snapshots as a consistent, static reference of the data in the primary database. The instructions from parallel backup program 400 indicate to each server the start and endpoint of their respective backup portion. In one embodiment of the present invention, parallel backup program 400 divides the generation of the backup copy so that half of the backup copy is generated by the primary database server, and the other half of the backup copy is generated by the secondary database server. In other embodiments of the present invention, the division between the database servers generating the backup portions may not be equal, such as 30% of the backup copy generated by the primary database server, and 70% of the backup copy generated by the secondary backup server.

Although the embodiments described in detail, herein, include sharing generation of backup copies between two computing devices, such as database servers, other embodiment may generate backup copies utilizing a plurality of computing devices, greater than two.

For example, parallel backup program 400 instructs primary database server 110 to begin a portion of the backup of primary database 125, using the first snapshot as a reference of the data, at the initial record. For a database file containing "N" records, parallel backup program 400 instructs primary database server 110 to complete its backup portion at the record corresponding to, or nearest to N/2. Parallel backup program 400 instructs secondary database server 130 to begin the remaining portion of the backup of primary database 125, using the second snapshot as a reference, at the record subsequent to the last record to be completed by primary database server 110, which may be the record corresponding to N/2+1, for example. Secondary database server 130 is instructed to complete its backup portion at the record corresponding to N, such that the combination of backup portions generated by primary database server 110 and the backup portion generated by secondary database server 130 includes all records in the database file of primary database 125, at the moment in time when the first snapshot was generated. Parallel backup program 400 instructs primary database server 110 and secondary database server 130 to send the respective backup portion data to backup server 145. In one embodiment of the present invention, the backup portions are stored on backup server 145, such that restoring the portions in a correct order is easily discerned, for example, by including the first record number of each portion in the file name.

Parallel backup program 400 determines if a parallel backup of the aggregate transaction log is to be generated (decision step 470). In some embodiments of the present invention, a backup copy of the aggregate transaction log may be generated by means of parallel backup program 400. The decision to generate a backup copy of the aggregate transaction log may be a user selected setting, or may be based on the file size of the aggregate transaction log (not depicted in FIG. 4), or may be based on analytic information from performing prior backups. Determining that parallel backup of the aggregate transaction log are to be generated (step 470, "YES" branch), parallel backup program 400 loops to step 430 to send a message to primary database server 110 to generate a snapshot of the aggregate transaction log, and proceeds as described above, but with respect to the aggregate transaction log.

Parallel backup program 400 sends a message to the backup server when backup is complete (step 480). The backup portions are generated, and the backup data is sent to the backup server. A confirmation of receipt may be received from backup server, and in response to completion of the backup copy portions being generated and sent to the backup server, parallel backup program 400 sends a message to the backup server acknowledging the completion of the backup, and parallel backup program 400 ends.

For example, primary database server 110 and secondary database server 130 generate their respective portions of the backup copy and send the backup data to backup server 145. Backup server 145 indicates to parallel backup program 400 that the backup portion data is being received. Subsequent to the completion of generating and sending the backup copy portions to backup server 145, parallel backup program 400 sends a confirmation message to backup server 145 that the backup is complete, and parallel backup program 400 ends.

In some embodiments of the present invention, transfer backup program 200, simultaneous backup program 300, and parallel backup program 400, may be operated by a workload computing device (not shown), which may be a computing device depicted in distributed computer processing environment 100, or a separate computing device not depicted, designated to distribute the backup workload, which makes use of a snapshot of the database and a snapshot of the snapshot, to generate backup copies of the aggregate transaction log and the data file, to perform respective operational steps described above.

Figure 5:
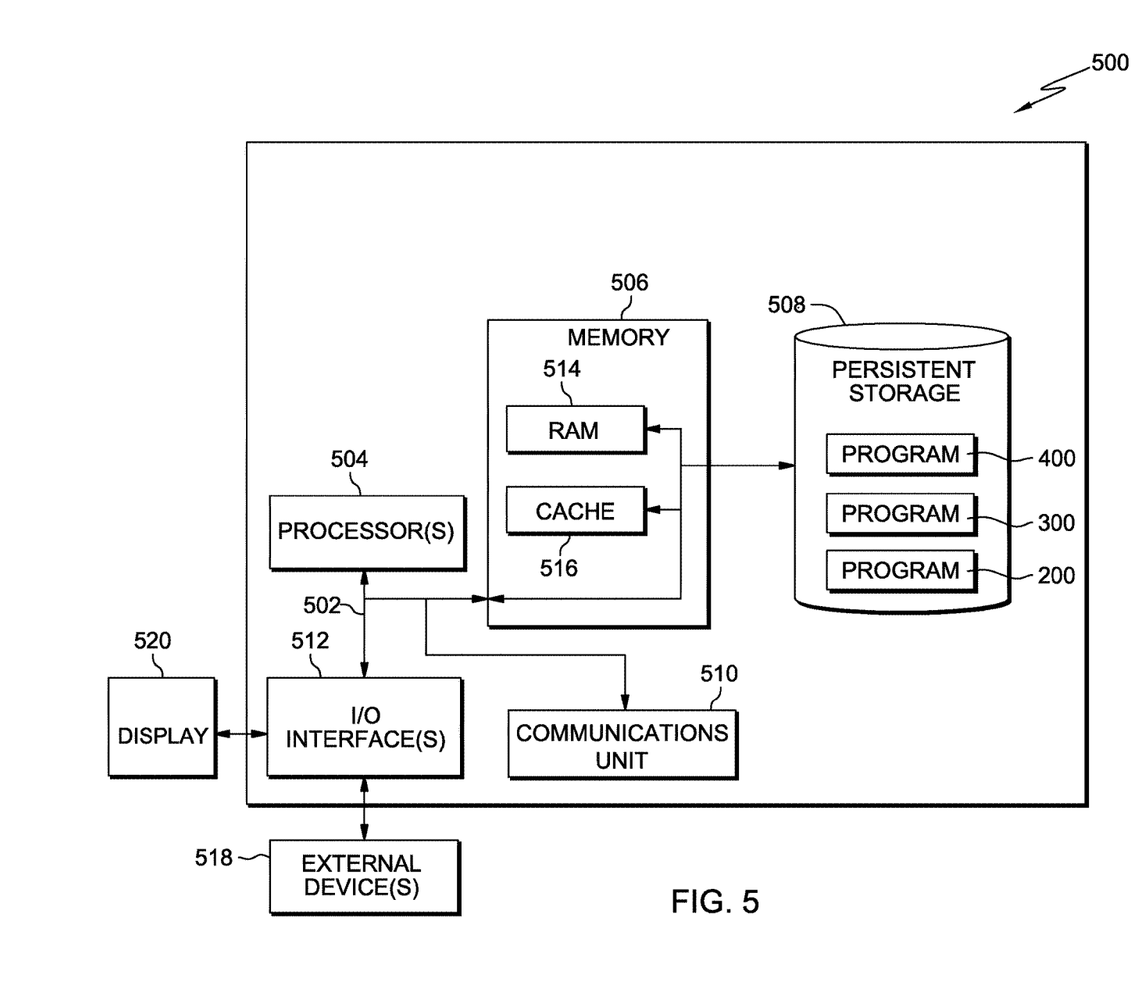
FIG. 5 depicts a block diagram of components of a database server capable of operating the transfer backup program, the simultaneous backup program, and the parallel backup program, in accordance with an embodiment of the present invention.

FIG. 5 depicts a block diagram of components of primary database server 110, secondary database server 130, primary storage hardware 120, secondary storage hardware 135, and database server 500, which are all capable of operating or executing instructions from, transfer backup program 200, simultaneous backup program 300, and parallel backup program 400, in accordance with an embodiment of the present invention.

It should be appreciated that FIG. 5 provides only an illustration of one implementation and does not imply any limitations with regard to the environments in which different embodiments may be implemented. Many modifications to the depicted environment may be made.

Database server 500, primary database server 110, and secondary database server 130, primary storage hardware 120, and secondary storage hardware 135, include communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media.

Transfer backup program 200, simultaneous backup program 300, and parallel backup program 400, are stored in persistent storage 408 for execution by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 408.

Communications unit 510, in these examples, provides for communications with other data processing systems or devices, including resources of distributed computer processing environment 100. In these examples, communications unit 510 includes one or more network interface cards. Communications unit 510 may provide communications through the use of either or both physical and wireless communications links. Transfer backup program 200, simultaneous backup program 300, and parallel backup program 400, may be downloaded to persistent storage 508 through communications unit 510.

I/O interface(s) 512 allows for input and output of data with other devices that may be connected to primary database server 110, secondary database server 130, primary storage hardware 120, secondary storage hardware 135, and database server 500. For example, I/O interface 512 may provide a connection to external devices 518 such as a keyboard, keypad, a touch screen, and/or some other suitable input device. In some embodiments of the present invention, external devices 518 may include primary storage hardware 120, which includes primary database 125, and secondary storage hardware 135, which includes secondary database 140. External devices 518 can also include portable computer-readable storage media such as, for example, thumb drives, portable optical or magnetic disks, and memory cards. Software and data used to practice embodiments of the present invention, e.g., transfer backup program 200, simultaneous backup program 300, and parallel backup program 400, can be stored on such portable computer-readable storage media and can be loaded onto persistent storage 508 via I/O interface(s) 512. I/O interface(s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for generating a backup copy of a database, the method comprising:

a primary computing device, generating a first snapshot of a primary database and additional snapshots of the primary database, wherein the additional snapshots are snapshots of the first snapshot, collectively creating a plurality of snapshots that each represent the state of the stored data at the time of the generation of the first snapshot, which results in identical snapshots having identical states of data within each snapshot, and the plurality of snapshots are available to the primary computing device, a secondary computing device, and zero or more additional computing devices, communicatively connected to the primary database;

in response to receiving an instruction to initiate a backup copy of content of the primary database, sending a snapshot of the plurality of snapshots, identical to the first snapshot, to the second computing device and to the zero or more additional computing devices;

the primary computing device generating a configurable first portion of a backup copy of the content of the primary database, based on a corresponding first portion of the first snapshot;

the primary computing device determining one or more configurable non-overlapping portions of the backup copy of the content of the primary database, designated for distribution to the second computing device and the zero or more computing devices, wherein the one or more configurable non-overlapping portions exclude the configurable first portion, which enables workload splitting of generation of the backup copy of the content of the primary database;

the primary computing device directing the second computing device and the zero or more computing devices to generate, respectively, a configurable portion of the backup copy of the content of the primary database by parallel processing of respective configurable portions of the backup copy, based on a corresponding portion of the snapshot of the plurality of snapshots received from the primary database, wherein the configurable portion of the backup copy respectively generated in parallel by the second computing device and the zero or more computing devices are non-overlapping portions of the backup copy, the combination of configurable portions of the backup copy includes a complete backup copy of the content of the primary database; and the primary computing device directing the second computing device and the zero or more computing devices to send their respective completed non-overlapping portion of the backup copy of the primary database to a backup computing device, wherein the backup copy of the primary database includes a backup copy of the data file of the primary database and a backup copy of a transaction log of the primary database.

* * * * *